UNITED STATES PATENT OFFICE.

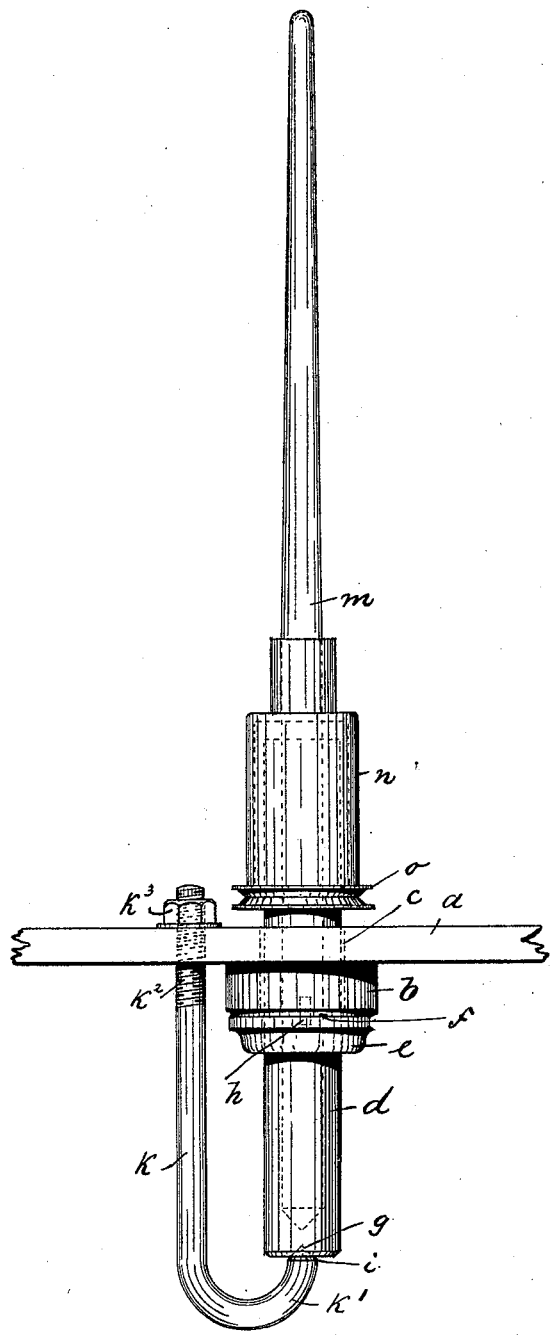

ADAM SCHEID, OF HARRISON, NEW JERSEY, ASSIGNOR TO THE SAWYER SPINDLE COMPANY, OF PORTLAND, MAINE.

SPINDLE.

SPECIFICATION forming part of Letters Patent No. 574,949, dated January 12, 1897.

Application filed November 17, 1896. Serial No. 612,517. (No model.)

*To all whom it may concern:*

Be it known that I, ADAM SCHEID, a citizen of the United States, residing in Harrison, Hudson county, and State of New Jersey, have invented certain new and useful Improvements in Spindles; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

My present invention relates to spinning-spindles which are flexibly mounted on the spindle-rail; and its object is to provide such spindles with means allowing a simple and reliable adjustment of their flexibility, and, further, a quick removal from and replacing of the spindle and its tube on the rail.

The invention consists in the improved spindle-support and in the combination and arrangement of the various parts thereof, substantially as will be hereinafter more fully described and finally embodied in the clauses of the claim.

In the accompanying drawing—a front elevation of my improved spindle-support—$a$ represents the spindle-rail, and $b$ a lug or collar downwardly projecting therefrom and penetrated by the hole or opening $c$, of a diameter a trifle larger than the diameter of the tube $d$. Said tube contains step and bolster bearing for the spindle $m$, which, as illustrated in the drawing, is provided with a sleeve $n$ and whirl $o$, and is thus adapted to obtain motion from a driving belt or band, as will be manifest.

The tube $d$ is provided with an annular flange $e$, bearing against a washer $f$, made of any suitable flexible material and arranged on the under side of the lug or collar $b$, which latter is connected with the flange $e$ of the tube $d$ by a pin $h$ to prevent rotation of said tube, as is well known in the art. The lower end of the tube $d$ is provided at its center with a conical recess $g$, adapted to be engaged by and rest on the conical-shaped end $i$ of the upturned portion $k'$ of the hook-shaped brace $k$, which latter is screw-threaded at its upper end, as at $k^2$, and after having penetrated the rail is engaged and held in normal position by a nut $k^3$, all as clearly shown in the drawing. By simply tightening or loosening the nut $k^3$ the flexibility of the spindle is easily regulated. Should it be required to remove the spindle-supporting tube, the nut $k^3$ is loosened and the hooked brace swung out of the path of the tube $d$.

What I claim as new, and desire to secure by Letters Patent, is—

1. The combination with the spindle-rail, of a tube containing step and bolster bearing, loosely arranged in said rail, an annular flange on said tube and arranged on the under side of the rail, said tube being provided at its lower end with a conical-shaped recess, a flexible washer between the flange and the under side of the rail, a hook-shaped brace adjustably arranged in the spindle-rail and engaging with its conical-shaped free end the conical-shaped recess of the tube, and a whirl-driven spindle in said tube, all said parts, substantially as and for the purposes described.

2. The combination with the spindle-rail, provided with a vertical hole or opening of a tube, containing step and bolster bearing, penetrating said opening, an annular flange on said tube and bearing on the under side of said rail, a flexible washer between said flange and the said rail, said tube being provided in the center of its lower end with a conical-shaped recess, a vertical brace screw-threaded at its upper end penetrating the rail, a nut on said screw-threaded end, the free end of said brace being hook-shaped and provided with a conical-shaped point engaging the conical recess of the tube, and a whirl-driven spindle in said tube, all said parts, substantially as and for the purposes described.

In testimony that I claim the foregoing I have hereunto set my hand this 3d day of October, 1896.

ADAM SCHEID.

Witnesses:
ALFRED GARTNER,
WM. D. BELL.